Oct. 25, 1927.
M. CASTRICUM
1,646,950
WEIGHING MOVING MATERIAL
Filed July 9, 1924
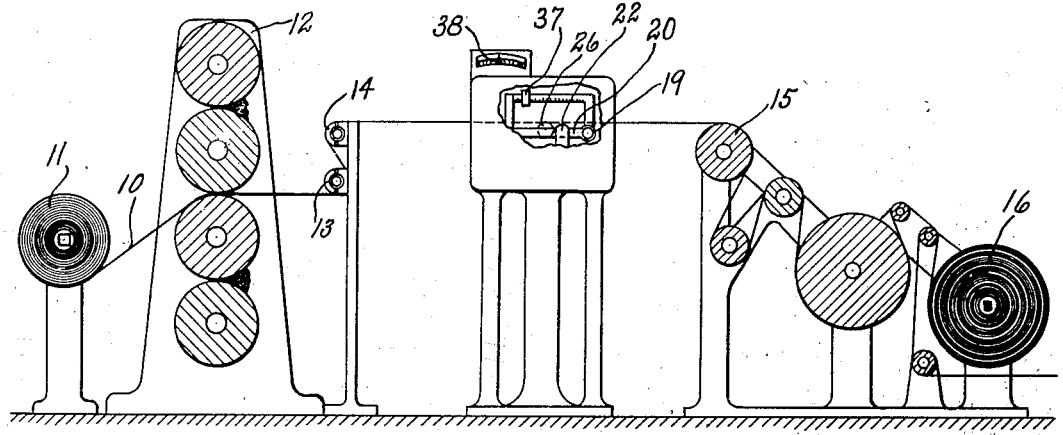
Fig.1.
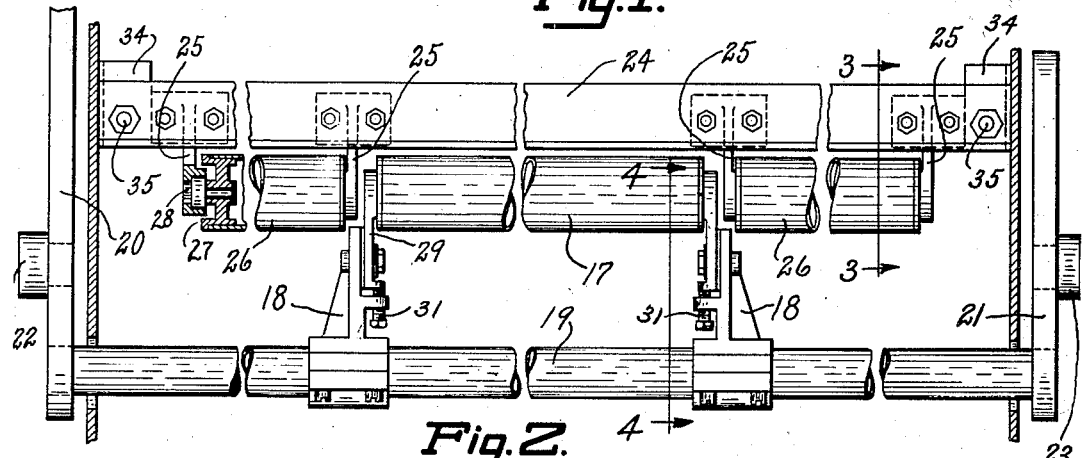
Fig.2.
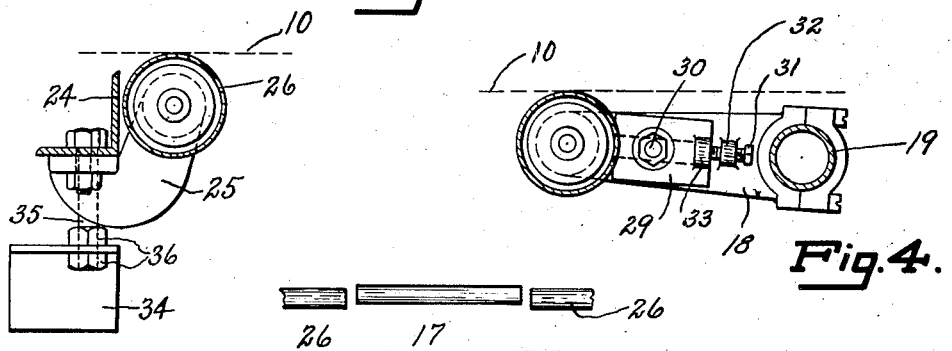
Fig.3.   Fig.5.
Fig.6.
INVENTOR.
Martin Castricum
BY
Edward C. Taylor
ATTORNEY.

Patented Oct. 25, 1927.

1,646,950

UNITED STATES PATENT OFFICE.

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

WEIGHING MOVING MATERIAL.

Application filed July 9, 1924. Serial No. 725,069.

This invention relates to the weighing of flexible sheet material while moving, and has particular reference to improvements in the invention set forth in my Patent No. 1,500,233, granted July 8, 1924. In that patent there is described a mechanism for weighing moving sheet material in which the edge portions of the sheet were held out of contact with the weighing roll so as to present a unit area of material for weighing at all times irrespective of variations in the widths of the sheet. It is the object of the present invention to improve upon this mechanism by supporting the edge portions in the same vertical plane as that on which the material is supported by the scale roll. This aligning of the side supports with the center roll eliminates certain minor inaccuracies inherent in the operation of the prior construction, and is conducive to a steadier action of the weighing apparatus.

Referring now to the drawings,

Fig. 1 is a diagrammatic section showing the general arrangement of the apparatus;

Fig. 2 is a plan of the portion of the apparatus relating more particularly to the present invention;

Fig. 3 is a detail section on line 3—3 of Fig. 2;

Fig. 4 is a detail section on line 4—4 of Fig. 2;

Fig. 5 is a diagrammatic elevation of the weighing and side-supporting rolls with the apparatus idle; and Fig. 6 is a similar elevation showing the sheet material in place.

The illustrated apparatus has been designed with especial reference to its use in weighing fabric which has just been coated with rubber, as a means of measuring the amount of rubber deposit placed thereon. In the drawings the fabric 10 to be rubberized passes from its supply 11 between the center pair of rolls of a rubber sheeting calender 12, here shown as of the four-roll type applying rubber simultaneously to both sides of the material. From the calender the sheet material passes over guide rollers 13, 14, and 15, and is wound upon a spool 16. The scale mechanism is located intermediate the guide rolls 14 and 15 and weighs so much of the width of the span of fabric between these rolls as is permitted by the side roll supporting devices now to be described.

The scale roll 17 upon which the portion of the fabric to be weighed rests is supported on arms 18 fixed on a cross shaft 19 secured at one side of the device to the scale beam 20, and at the other to dummy lever 21. The scale beam is pivoted at 22 and the dummy lever at 23, these pivots being in axial alignment with each other. The effect of this coupling is of course to make the scale roll 17 act as though it were attached to the scale beam and the dummy lever at points on the prolongation of its own axis. Since this axis is, in the embodiment shown, on the opposite side of the pivots 22, 23, from shaft 19, the latter will rise when a downward pressure is exerted on roll 17. On a cross bar 24 secured to a fixed part of the apparatus are mounted arms 25 which carry pivots for the rollers 26 which support the side portions of the fabric.

The arms 25 are located as close as possible to arms 18, and the external bearing structures for the rolls 17 and 26 are made as thin as possible so as to avoid any unnecessary gap between the ends of the rollers. As a preferred form of bearing structure, headers 27 are secured to the inside of the rolls 26 and carry, pinned to them, shafts 28 having enlargements fitting within recessed bearings in the end of the arms 25. The mounting for the scale roll 17 is similarly constructed except that the roll is not mounted directly upon arms 18 but upon members 29 slidably mounted in ways on the side of arms 18 and held thereto by bolts 30. An adjusting screw 31 threaded into a lug 32 on each arm 18 bears against an ear 33 on the corresponding member 29. When bolt 30 is loosened the adjusting screw 31 may be operated to vary the position of roll 17 in a horizontal plane, each end of the roll being separately adjustable. Vertical adjustment to bring roll 17 into alignment with rolls 26 is provided for on the mounting for the latter rolls, the cross bar 24 on which the arms 25 are mounted being supported from a stationary bracket 34 by a post having lock nuts 36 whereby it may be held in any desired vertical position. These adjusting devices, while not essential to the invention in its broader aspect, are desirable since by their use inequalities in the construction of the device may be compensated for and accurate alignment of the various rolls brought about.

The operation of the device, while for the most part clear from the above description, may be summarized briefly as follows. When no fabric is passing over the weighing roll 17 this roll will be slightly elevated with respect to rolls 26 (Fig. 5) by reason of the overbalancing of the scale beam by the poise weight 37 (Fig. 1). In using the scale the poise weight is set for the weight of material desired, and the coating apparatus 12 adjusted so that the scale, as indicated by pointer 38, is brought into balance. This condition is illustrated in Fig. 6, where it will be observed that the presence of the fabric causes the rolls 17 and 26 to come into alignment, this being the condition when the coated fabric is of the proper weight. With the rolls in alignment both horizontally and vertically (cf. Figs. 2 and 6), the fabric rests evenly upon them, and the scale roll registers accurately the weight of the material between the side rolls 26.

Having thus described my invention, I claim:

1. In an apparatus for weighing a unit width of moving sheet material, spaced supports between which the material freely passes, a scale roller intermediate these supports, weighing mechanism operatively connected to the scale roller, and a pair of stationary rollers located closely adjacent the scale roller and in axial alignment therewith, said stationary rollers being adapted to prevent the weight of the wide portions of the material from resting upon the scale roller.

2. In an apparatus for weighing a unit width of moving sheet material, spaced supports between which the material freely passes, a scale roller intermediate the supports, weighing mechanism operatively connected to the scale roller, a pair of stationary rollers located closely adjacent the scale roller and in axial alignment therewith, and offset mountings respectively connecting the scale roll to the weighing mechanism and the stationary rollers to a stationary part of the machine.

MARTIN CASTRICUM.